United States Patent [19]

Colanzi

[11] Patent Number: 4,582,338

[45] Date of Patent: Apr. 15, 1986

[54] VEHICLE WHEEL BEARING

[75] Inventor: Franco Colanzi, Turin, Italy

[73] Assignee: RIV-SKF Officine di Villar Perosa S.p.A., Turin, Italy

[21] Appl. No.: 571,921

[22] Filed: Jan. 19, 1984

[30] Foreign Application Priority Data

Jan. 26, 1983 [IT] Italy ............................. 52875/83[U]

[51] Int. Cl.$^4$ ............................................. B60B 3/00
[52] U.S. Cl. ................................... 280/688; 301/125
[58] Field of Search ............... 280/668; 301/6 R, 124, 301/125, 123

[56] References Cited

U.S. PATENT DOCUMENTS

| 3,703,215 | 11/1972 | Takahashi | 280/668 |
| 4,105,222 | 8/1978 | Buchwald | 280/668 |
| 4,491,340 | 1/1985 | Grunberg et al. | 280/668 |

FOREIGN PATENT DOCUMENTS

| 1254553 | 11/1971 | United Kingdom . |
| 1397965 | 6/1975 | United Kingdom . |
| 1541375 | 2/1979 | United Kingdom . |

Primary Examiner—Richard A. Bertsch
Attorney, Agent, or Firm—Omri M. Behr

[57] ABSTRACT

A bearing designed to fit on a vehicle suspension of the "McPherson" type connects the vehicle wheels to the respective shock absorbers. The bearing is formed by an inner ring, an outer ring, and rolling bodies inserted between the rings, which are both provided with respective integral flanges. One of these flanges is provided with a projecting arm integral with the same and having a recess, able to be connected to a ball pin of a rocker arm of the suspension.

10 Claims, 6 Drawing Figures

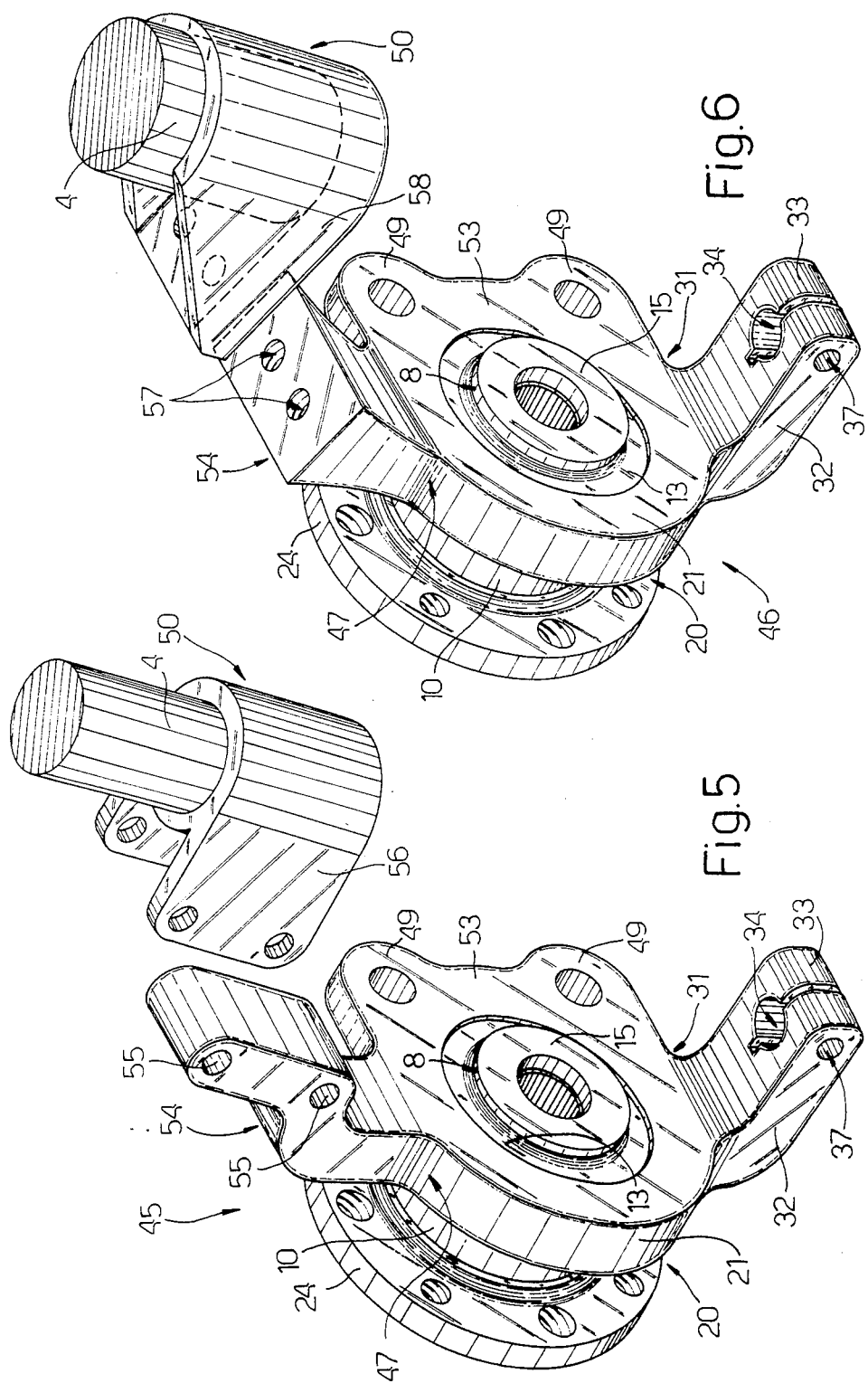

VEHICLE WHEEL BEARING

BACKGROUND OF THE INVENTION

The present invention relates to a vehicle wheel bearing designed to fit on a vehicle suspension so as to connect the wheel to the shock absorber on the suspension, at the same time enabling it to turn.

A known requirement of manufacturers is that of reducing the number and/or simplifying the design of various vehicle subassembly components, in particular, suspension parts.

The latest suspensions consist almost exclusively of what are known as "Mac Pherson" types, comprising a shock absorber, fitted to an upright with respective arms for connecting a steering link and a rocker arm connecting the suspensions on the same axle, and what is known as a "twin-flanged" bearing, that is, comprising an outer ring with an integral flange designed to fit on to the suspension upright, and an inner ring with an integral flange, opposite to the first, designed to fit straight on to the wheel. Rolling bodies are assembled between the inner and outer ring and, in the case of drive wheels, the inner ring is fitted with a splined coupling for receiving the drive torque from a pin on a homokinetic coupling. The inner ring therefore acts as a hub or stub axle, besides carrying the brake disc (or drum), whereas the brake calipers are supported either directly by the upright or by a sheet metal piece fitted to the upright itself. Suspensions of the above type involve a number of drawbacks. In particular, the connecting arm for the ball pin on the rocker arm entails a special upright design that is not only difficult to manufacture but must also be made in a single high-cost press operation. Furthermore, the fact that the connecting arm is integral with the upright increases load strain on the upright which must therefore be made using suitably thick sheet which increases both vehicle weight and fuel consumption. Finally, to adapt the offset of the suspension to different vehicle types, the entire upright must be replaced by one with a connecting arm of different design and/or location which means mass production economy is lost.

SUMMARY OF THE INVENTION

The aim of the present invention is to provide a twin-flanged bearing for a vehicle suspension designed to overcome the aforementioned drawbacks, in particular, one enabling the use of simple uprights that are cheap to manufacture and need not be changed for adapting the offset of the suspension, and which even enables the upright to be dispensed with altogether so as to reduce drastically the number of components on the suspension.

With these aims in view, the present invention relates to a vehicle wheel bearing designed to fit on to the said vehicle suspension for connecting the said wheel to the shock absorber on the said suspension, at the same time enabling it to turn; the said bearing comprising an inner ring, forming one piece with a first flange, and an outer ring, forming one piece with a second flange, opposite to the first, between which a number of revolving bodies are fitted; the said flanges being designed to fit respectively on to the said wheel and the said shock absorber, characterised by the fact that one of the said flanges is provided with a projecting arm integral with the said flange and provided with a recess for connecting a ball pin on a rocker arm of the said suspension.

BRIEF DESCRIPTION OF THE DRAWINGS

A number of arrangements of the present invention will now be described, by way of non-limiting examples, with reference to the attached drawings, in which:

FIGS. 3 to 6 show perspective views of variations of the FIG. 1 suspension bearing and how to assemble it.

DETAILED DESCRIPTION OF THE INVENTION

Figure 1:
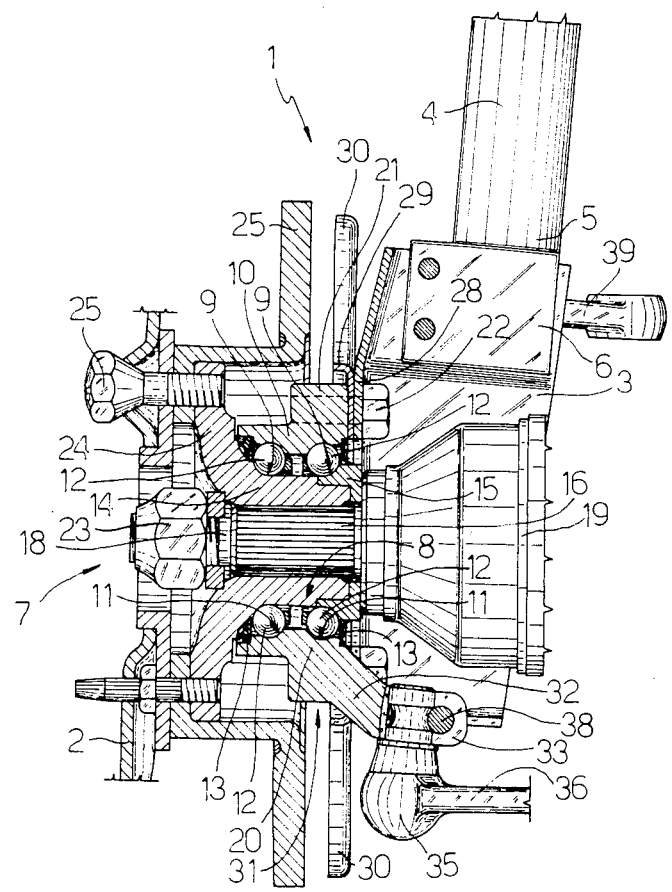
FIG. 1 shows a section of a bottom portion of a vehicle suspension fitted with a bearing according to the present invention.

Number 1 in FIG. 1 indicates a suspension for a wheel (2) (only part of which is shown) on a vehicle not shown in the drawing. Suspension 1 is what is known as a Mac Pherson type comprising an upright (3), preferably made of pressed sheet, a shock absorber (4), the top end of which (not shown) is fitted in the known manner to the vehicle body and the bottom end (5) of which is provided with a connecting end (6) fitted integral to the upright, and a bearing for wheel 2, designed to connect the latter to upright 3 and, consequently, to shock absorber 4 so that the said wheel 2 can turn. Bearing 7 comprises an inner ring (8) with tracks 9, an outer ring (10) with tracks 11 facing tracks 9, a number of rolling bodies (12), between rings 8 and 10, designed to roll between tracks 9 and 11, and, finally, sealing assemblies 13. In the example shown, inner ring 8 consists of two annular elements (14, 15) connected together and assembled, by means of splined coupling 16, integral with pin 18 on spherical (homokinetic) coupling 19 which is of the known type and connected in the known way (not shown) to an axle shaft on the vehicle. Outer ring 10, on the other hand, is fitted, on end 20 facing element 15, with a connecting flange (21) designed to fit on to upright 3 using screws 22. Inner ring 8 is clamped axially on to pin 18 by means of nut 23 and is fitted, on the wheel 2 side, with a connecting flange (24) forming a single piece with element 14. Flange 24 and, consequently, inner ring 8, which forms one piece with it, acts as a hub for wheel 2 which, together with brake disc 25, is assembled integral with flange 24 by means of screws 26.

Figure 2:
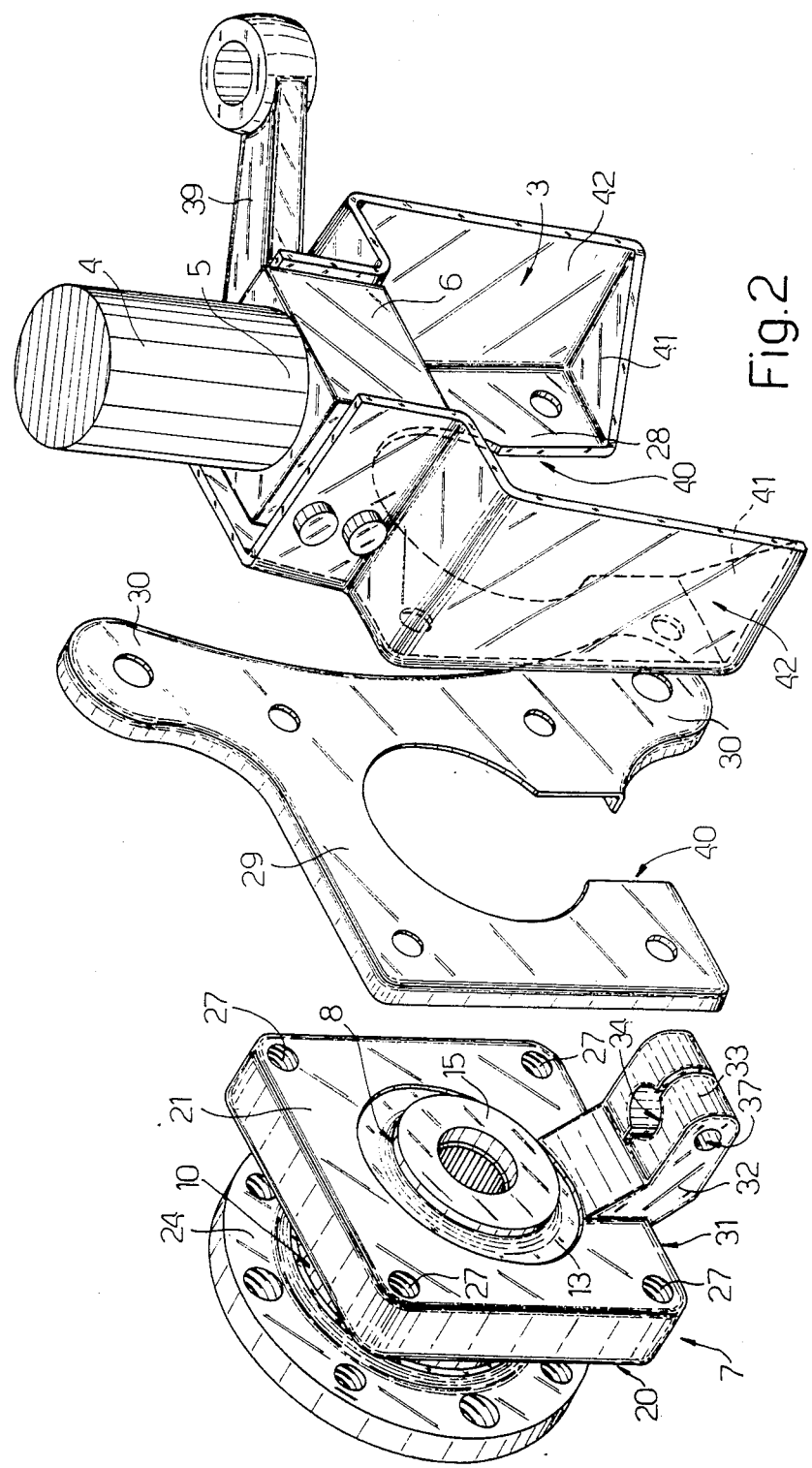
FIG. 2 shows an exploded view in perspective of the main parts on the FIG. 1 suspension.

As also shown in FIG. 2, flange 21 forms one piece with outer ring 10, is opposite flange 24 and is preferably square-shaped with assembly holes (27) at the tips. Between flange 21 and back plate 28 on upright 3, which is essentially cup-shaped, an essentially flat pressed sheet metal element (29) is inserted, the said element being designed to be tightened between bearing 7 and upright 3 and being provided with ears (30) for known types of brake calipers (not shown) designed to operated in conjunction with disc 25 to prevent wheel 2 from turning.

According to the present invention, the bottom edge (31) of flange 21 is provided with a projecting arm (32) forming one piece with flange 21 and outer ring 10 and provided, at end 33, with a recess (34) for connecting the ball pin (35) (FIG. 1) of a rocker arm (36) on suspension 1, connected in the known way (not shown) to the vehicle body with a torsion bar connecting the suspensions (1) on each vehicle axle. Recess 34 is fork-shaped with a hole (37) for a clamping component (38) designed to secure pin 35 in recess 34. Arm 32 is of known design, located on the centre line of edge 31 and extending downwards from flange 21 from which it branches out in the opposite direction to wheel 2, that is, on the opposite side to that facing flange 24.

Upright 3, which is of simple design, essentially parallelepiped and pressed in one blow, is provided with a side arm (39) for connecting a steering link (not shown) on the vehicle. Arm 39 forms one piece with upright 3 or, preferably, is integral with end 6 and projects laterally from shock absorber 4. By way of an alternative, arm 39 may be fitted in any appropriate manner straight on to shock absorber 4. To enable arm 32 to fit through to rocker arm 36, part 29 and upright 3 are provided with cut-outs (40) facing each other and upright 3 is left open at the bottom and strengthened solely by two corner portions (41) connecting back plate 28 to sides 42 on upright 3 itself.

FIGS. 3 to 6 show perspective views respectively of variations 43, 44, 45 and 46 of bearing 7 in FIGS. 1 and 2, designed to fit on to suspension 1 in place of bearing 7. As described hereafter, the said variations shown in FIGS. 3, 4, 5 and 6 are also designed to replace upright 3 in addition to bearing 7. The details similar or identical to those already described are shown using the same numbers.

Figure 4:
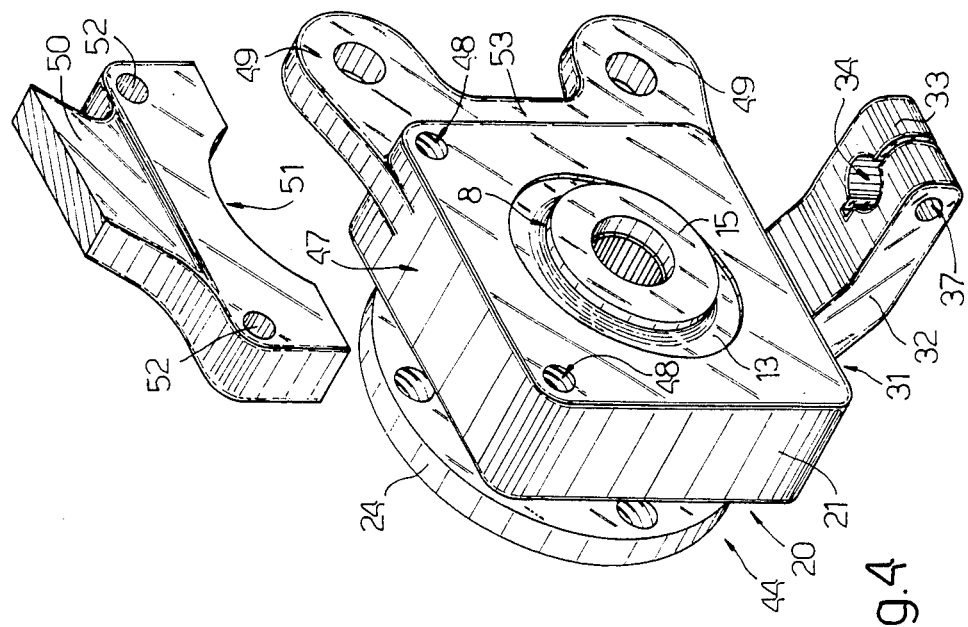
Figure 3:
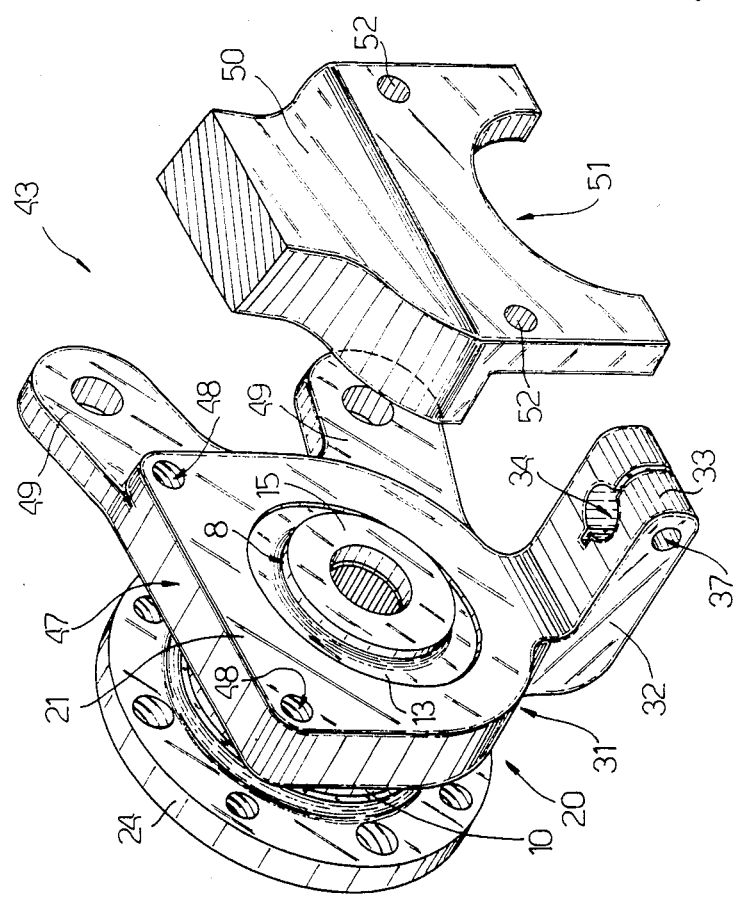

As shown in FIG. 3, bearing 43 differs frm 7 as to the shape of flange 21 the bottom edge (31) of which is semicircular instead of straight. Flange 21 also has a straight top edge (47) with connecting holes (48) at either end, whereas holes 27 are not provided, and is provided on edges 31 and 47 with a pair of projecting ears (49) for connecting the said brake calipers for clamping wheel 2. Ears 49 are made integral with flange 21 from which they project laterally. Shock absorber 4, omitted for the sake of simplicity, is provided with a bottom connecting end (50) which differs from 6 in that it is provided with an integral L-shaped connecting bracket (51) designed to connect up with and rest on edge 47 and provided with holes (52) to enable it to be connected to flange 21 using screws not shown in the drawing. In this way, flange 21 can be fitted straight on to end 50 and, consequently, replace upright 3 on suspension 1 which may thus be dispensed with. FIG. 4 shows a bearing (44) identical to 43, except that edge 31 is straight. Furthermore, ears 49 are connected together by a strengthening rib (53) and the top edge (47) is designed to connect with a bracket (51) designed differently from the one in FIG. 3.

Bearing 45 in FIG. 5 is a variation of bearing 43 in FIG. 3 from which it differs as to the shape of flange 21, which is entirely circular, the shape of ears 49 and, above all, edge 47 which is provided with a projecting connecting piece (54) forming one piece with flange 21. Piece 54, which is S-shaped with cross holes (55), is designed to connect up with a fork-shaped bracket (56) integral with showk absorber 4. Finally, bearing 46 in FIG. 6 is a variation of bearing 45 from which it differs solely as to the shape of connecting pieces 54, which is shaped like a truncated pyramid and provided with front connecting holes (57) on the larger base. Piece 54 on bearing 46 is designed to connect at the front to a bracket (58) integral with shock absorber 4 in place of bracket 56.

The advantages of the bearing covered by the present invention will be clear from the description given. Firstly, it provides for simplifying the design of suspension uprights, reducing cost and weight, and simplifying assembly of the suspension itself. Secondly, it provides for adapting suspension 1 cheaply and easily to any type of vehicle by simply replacing the bearing (which would be necessary in any case when switching to a heavier, more powerful vehicle) with another having a different arm (32) designed to vary the offset and trim of suspension 1. Finally, if provided with brake caliper connectors, the bearing covered by the present invention may also be used as an upright on the suspension so as to provide highly simplified, lightweight suspensions (1) without the traditional sheet metal upright.

To those skilled in the art it will be clear that changes can be made to the bearing described by way of a non-limiting example without, however, departing from the scope of the present invention.

I claim:

1. Vehicle wheel bearing designed to fit on to said vehicle suspension for connecting said wheel to the shock absorber structure on said suspension, at the same time enabling it to turn; said bearing comprising an inner ring, forming one piece with a first flange, and an outer ring, forming one piece with a second flange, opposite to the first, between which a number of revolving bodies are fitted; said first and second flanges being designed to fit respectively on to said wheel and said shock absorber, said second flange projecting primarily radially to a place of attachment at which place said shock absorber structure is attached to said flange, one of said flanges having a projecting arm made intergral with said flange and provided with a recess for connecting a ball pin on a rocker arm of said suspension.

2. Bearing according to claim 1, characterised by the fact that said flange (21) provided with said projecting arm (32) has a pair of integral ears (49) for connecting the brake calipers of said wheel (2).

3. Bearing (43, 44, 45, 46) according to claim 2, characterised by the fact that the said ears (49) for connecting the said brake calipers are integral with the said second flange (21) from which they project laterally.

4. Bearing (7) according to claim 1, characterised by the fact that the said flange (21) provided with the said projecting arm (32) is designed to fit integral with an upright (3) on the said suspension (1) by means of removable connecting means (22), the said shock absorber (4) being fitted integral with the said upright (3).

5. Bearing (43, 44, 45, 46) according to claim 1 characterised by the fact that the said flange (21) provided with the said projecting arm (32) is designed to fit integral with and straight on to a connecting end (50) of the said shock absorber by means of removable connecting means, so that it may be used as an upright of the said suspension (1).

6. Bearing (45, 46) according to claim 5, characterised by the fact that the said flange (21) provided with the said projecting arm (32) is provided with an integral connecting piece (54) for the said end (50) of the said shock absorber (4), the said connecting piece (54) being designed to connect up with at least one connecting brack et (56, 58) integral with the said shock absorber (4).

7. Bearing (45, 46) according to claim 6, characterised by the fact that the said piece (54) for connecting the said end (50) of the shock absorber (4) projects from the top edge (47) of the said second flange (21), the bottom edge (31) of the said flange being provided with the said projecting arm (32).

8. Bearing (7, 43, 44, 45, 46) according to claim 1, characterised by the fact that the said projecting arm (32) forms one piece with the said second flange (21) which is made integral with one end (20) of the said outer ring (10) facing away from the said wheel (2).

9. Bearing (7, 43, 44, 45, 46) according to claim 1, characterised by the fact that the said projecting arm (32) extends from the bottom of the said second flange (21) in the opposite direction to the said wheel (2).

10. Suspension (1) for a vehicle wheel (2), characterised by the fact that it comprises a bearing (43, 44, 45, 46) according to claim 1, the shock absorber (4) of the said suspension (1) being provided laterally with a lever (39), for connecting a steering link on the vehicle, and a bottom connecting end (50) designed to fit straight on to and integral with the said second flange (21) on the said bearing (43, 44, 45, 46).

* * * * *